Aug. 22, 1933.         C. B. CLARK         1,923,256
PROCESS OF MAKING CONTACT SULPHURIC ACID
Filed March 29, 1930
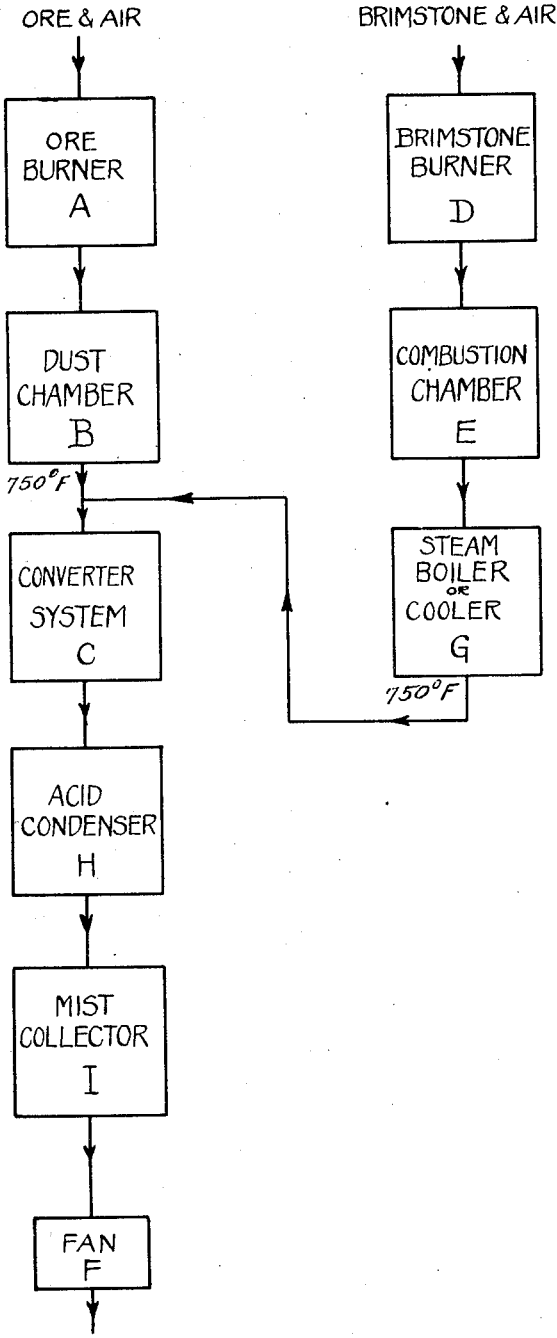

Patented Aug. 22, 1933

1,923,256

UNITED STATES PATENT OFFICE 1,923,256

PROCESS OF MAKING CONTACT SULPHURIC ACID

Cyril B. Clark, Scarsdale, N. Y., assignor to Catalytic Process Corporation, New York, N. Y., a Corporation of Delaware Application March 29, 1930. Serial No. 439,908

12 Claims. (Cl. 23—176)

My invention relates more particularly to the production of strong sulphur dioxide gas for the manufacture of sulphuric acid through the catalytic oxidation of such sulphur dioxide gas to sulphur trioxide by passing the gas mixture in contact with suitable catalytic materials without allowing the temperature of the gases from their inception to fall materially below that required for a high percentage conversion to sulphuric anhydrid in the converter.

In making sulphuric acid by the contact process, the gases containing sulphur dioxide must have proper temperatures, composition and purity. Such gases must have a temperature around 750° F. to cause conversion to start when using the various types of vanadium catalysts now available; the gases should contain about 10% of sulphur dioxide with a small excess of uncombined oxygen over that required to form sulphur trioxide; and such gases must be relatively pure with respect to their content of dust, fume and other solid impurities.

To obtain the necessary purity when roasting pyrites ore or smelting various sulphur-containing ores with resulting $SO_2$ gas, I have discovered it economically adavntageous to conserve the heat of the burner gas so that its temperature throughout the successive steps to the converter are preferably maintained around 750° F. as described in my pending application for patent filed March 18, 1930 Serial No. 436,655. Between the burner and converter dust and fume are removed from the gas without any substantial lowering of temperature of the gas.

When using sulphur-containing ores as the source of sulphur dioxide gas, great difficulties are encountered in producing the required 10% $SO_2$ gas, but when burning brimstone and operating according to the procedure described in my said application for patent Serial No. 436,655, strong $SO_2$ gas is produced with the necessary excess of free oxygen contained in the gas and having a sulphur dioxide content in excess of that required in the catalyst converter.

In the U. S. patent to Merriam No. 1,737,320 of November 26, 1929 a process is described of using the heat of the $SO_2$ gas made from brimstone to heat and strengthen gas made from ore which had been subjected to a cold purification treatment. One of the disadvantages of this method of operation is the wasting of heat for reheating the burner gas derived from the ore which might otherwise be utilized advantageously for other purposes, such as the production of steam in a suitable boiler interposed between the burner and converter.

According to my improved procedure the sulphur dioxide containing gases, whether made from ore or brimstone, are never permitted to drop below about 750° F. When burning ore it is necessary to conserve the heat, but when burning brimstone surplus heat must be removed. This heat is available for useful purposes if not required as in this Merriam process for heating up the ore gas. In the older processes of making sulphuric acid, it is difficult to obtain high strengths of sulphur dioxide and still conserve this heat.

An object of my invention, among other things, is to provide an improved process in which no preheating of the sulphur dioxide gases is required by any means and in which surplus heat is made available for use with various economies of operation heretofore not possible.

A further object is to provide a process in which the strength of the sulphur dioxide gas may be maintained relatively strong, and at that concentration desired for optimum operating conditions as well as that most efficient from the standpoint of strength of sulphur dioxide.

According to the process which I have discovered a stream of gas made from roasting or smelting ore and subjected to a hot purification is thereafter mixed with a stream of gas made from brimstone and cooled to about 750° F., with the proportionate amounts of the two streams regulated to produce a resulting gas mixture having the proper temperature for conversion and the desired concentration of the sulphur dioxide before contacting with the catalyst. By this procedure the necessity of preheating cold gas is avoided, and the surplus heat of the hot brimstone gas is made available for the generation of steam or other purposes. Furthermore, the relatively weak gas from the ore burning part of the plant, is strengthened to provide a mixed gas passing to the converters of the optimum strength for most efficient operation.

In describing my invention, I will now refer to the accompanying flow-sheet drawing showing a contact sulphuric acid plant in which my process may be practiced. The ore burner A represents any means for producing a relatively impure sulphur dioxide gas such as may be obtained by roasting or smelting sulphur bearing ores, and from which dust fume and other solid impurities may be partially or completely removed before it is passed preferably to a vanadium catalyst of the type described in the U. S. Jaeger Patents Nos. 1,675,308 and 1,675,309 as well as No. 1,694,123. The gas from the burner A may contain dust, fume, etc. To purify the gas of these substances it is passed through the dust chamber B which may be of the Cottrell type, and in which a large portion of these impurities is eliminated.

During these operations the temperature of the gas is conserved so that it leaves the dust chamber B at around 750° F. or at as near this temperature as possible. It is to be understood that no cold purification of the gas is contemplated, and that the step of reducing the gases to atmospheric temperatures or slightly above is also avoided in practicing my improved process.

The gas from the dust chamber B is now sufficiently pure for passage to the converter C, but is relatively weak and requires strengthening to permit the greatest efficiency in the converter and subsequent equipment. In accordance with my improved procedure the strengthening of the gas is accomplished by the introduction of controlled amounts of cooled brimstone gas.

Such cooled $SO_2$ gas is derived from brimstone burned in the burner D and any sublimed sulphur burned in the combustion chamber E. Air drawn into the burner D by the blower or fan F furnishes the oxygen for combustion and additional air, where desirable, may be introduced after the burner D and before the combustion chamber E.

The gas issuing from the combustion chamber will have a temperature in excess of 1,000° F. To cool this gas it should then be passed through the steam boiler G to reduce its temperature to about 750° F. This cooled gas is now mixed with the gas from the dust chamber B, and the combined gas flow passes to the converter C which may be of the self-cleaning type described in my pending application for patent filed September 5, 1929, Serial No. 390,510, and contains the catalyst. Leaving the converter C the gases pass to the acid condenser H which may be of the type described in my pending application for patent filed September 10, 1929, Serial No. 391,576, to which is coupled the mist collector I.

In my process it will be noted that no cooling of the gas takes place with subsequent reheating. The heat changes in this process are all to the end of reducing temperature and not of raising temperatures, and the surplus heat from the brimstone part of the plant is available for any useful purpose desired. Furthermore there is no material lowering of the temperature of the gases followed by a material raising thereof, and under these conditions satisfactory conversion can be obtained without risk of poisoning the contact material which might otherwise occur.

A desirable feature of my process lies in that the temperature of the gases is never lowered below the conversion temperature, not even the gases coming from the ore burning part of the plant, until after they have passed through the converter. Hence no dangerous reduction of temperature takes place to a point below that where sulphuric acid would condense and injuriously attack the apparatus.

The brimstone burner D is operated to produce a relatively strong sulphur dioxide gas in the combustion chamber E. This gas is cooled in the waste heat boiler G to about 750° F. and then mixed with the gas from the ore burning plant and passed to the converter C. The gas leaving the combustion chamber E and entering the waste heat boiler G will be around 1,400° F. and consequently about 650° F. of heat is available in the gas for the production of steam or for other purposes.

When producing a relatively weak gas from smelting or roasting pyrrhotite ores, it will be necessary to add a larger proportion of the brimstone gas. Since my process provides an excess of heat under all conditions of operation, there is no difficulty encountered in industrial practice.

It is only necessary to provide the necessary cooling of the brimstone gas to bring same down to about 750° F. before mixing it with the ore gas. A larger amount of heat will be made available for steam generation when burning pyrrhotite ore than when burning pyrite ore.

I claim as my invention:—

1. In a contract sulphuric acid process, the steps which comprise removing non-gaseous impurities from a relatively impure sulphur dioxide ore-burner gas maintained above conversion temperatures and mixing the heated partially purified gas with a relatively pure sulphur dioxide gas cooled to approximately the temperature of said heated partially purified gas.

2. In a contact sulphuric acid process, the steps which comprise removing non-gaseous impurities from a relatively impure sulphur dioxide ore-burner maintained at a temperature of about 750° F. and mixing the heated partially purified gas with a relatively pure sulphur dioxide gas cooled to approximately 750° F.

3. In a contact sulphuric acid process, the steps which comprise producing a relatively impure sulphur dioxide gas mixture from burning sulphur-containing ores, removing dust and fume therefrom while maintaining the temperature of the gas above 750° F., and mixing such heated partially purified gas with a relatively pure sulphur dioxide gas of approximately the same temperature.

4. In a contact sulphuric acid process, the steps which comprise removing non-gaseous impurities from a relatively impure sulphur dioxide ore-burner gas maintained above conversion temperatures and mixing the heated partially purified gas with a relatively pure gas having a greater sulphur dioxide content than, but at approximately the same temperature of, said heated partially purified gas.

5. In a contact sulphuric acid process in which a relatively impure sulphur dioxide ore-burner gas free from non-gaseous impurities while maintained at temperatures around 750° F., the step which comprises mixing said heated partially purified gas with a relatively pure sulphur dioxide gas obtained from burning brimstone and cooled to approximately the same temperature.

6. In a contact sulphuric acid process in which a relatively impure sulphur dioxide ore-burner gas free from non-gaseous impurities while maintained at temperatures around 750° F., the step which comprises mixing said heated partially purified gas with a relatively pure sulphur dioxide gas obtained from burning brimstone and cooled to approximately the same temperature, said last-mentioned gas having a sulphur dioxide content greater than that of said partially purified gas.

7. The process of making contact sulphuric acid which comprises producing a relatively impure sulphur dioxide ore-burner gas, removing non-gaseous impurities from said gas with its temperature maintained around conversion temperatures, producing a relatively pure sulphur dioxide gas from burning brimstone, cooling said last-mentioned gas to around conversion temperatures, mixing the two gases, and converting the combined gas flow to sulphuric anhydrid by catalytic oxidation.

8. The process of making contact sulphuric acids which comprises producing a relatively impure sulphur dioxide ore-burner gas, removing non-gaseous impurities from said gas with its temperature maintained around conversion temperatures, producing a relatively pure sulphur dioxide gas from burning brimstone, cooling said last-mentioned gas to around conversion temperatures, mixing the two gases, and converting the combined gas flow to sulphuric anhydrid by catalytic oxidation, the temperatures of the gases throughout the successive steps being maintained around 750° F.

9. The process of making contact sulphuric acid which comprises producing a relatively impure sulphur dioxide ore-burner gas, removing non-gaseous impurities from said gas with its temperature maintained around conversion temperatures, producing a relatively pure sulphur dioxide gas from burning brimstone, cooling said last-mentioned gas to around conversion temperatures, mixing the two gases in controlled proportions to produce a combined gas flow of predetermined sulphur dioxide concentration, and converting the combined gas flow to sulphuric anhydrid by catalytic oxidation.

10. The process of making contact sulphuric acid which comprises producing a relatively impure sulphur dioxide ore-burner gas, removing non-gaseous impurities from said gas with its temperature maintained around conversion temperatures, producing a relatively pure sulphur dioxide gas from burning brimstone, cooling said last-mentioned gas to around conversion temperatures, mixing the two gases, and converting the combined gas flow to sulphuric anhydrid by catalytic oxidation in the presence of a vanadium catalyst.

11. The process of making contact sulphuric acid which comprises producing a relatively impure sulphur dioxide ore-burner gas, removing non-gaseous impurities from said gas with its temperature maintained around conversion temperatures, producing a relatively pure sulphur dioxide gas from burning brimstone, cooling said last-mentioned gas to around conversion temperatures, mixing the two gases, and converting the combined gas flow to sulphuric anhydrid by catalytic oxidation in the presence of a vanadium catalyst, the temperatures of the gases throughout the successive steps being maintained around 750° F.

12. The process of making contact sulphuric acid which comprises producing a relatively impure sulphur dioxide ore-burner gas, removing non-gaseous impurities from said gas with its temperature maintained around conversion temperatures, producing a relatively pure sulphur dioxide gas from burning brimstone, cooling said last-mentioned gas to around conversion temperatures, mixing the two gases in controlled proportions to produce a combined gas flow of predetermined sulphur dioxide concentration, and converting the combined gas flow to sulphuric anhydrid by catalytic oxidation in the presence of a vanadium catalyst, the temperatures of the gases throughout the successive steps being maintained around 750° F.

CYRIL B. CLARK.